ANALOG TO DIGITAL CONVERTER

Filed June 10, 1960

INVENTOR.
DON E. MEIER
BY
ATTORNEY

ANALOG TO DIGITAL CONVERTER

Filed June 10, 1960 3 Sheets-Sheet 2

INVENTOR.
DON E. MEIER
BY [signature]
ATTORNEY

Oct. 5, 1965 D. E. MEIER 3,210,753

ANALOG TO DIGITAL CONVERTER

Filed June 10, 1960

3 Sheets-Sheet 3

INVENTOR.
DON E. MEIER
BY [signature]
ATTORNEY

United States Patent Office 3,210,753
Patented Oct. 5, 1965

3,210,753

ANALOG TO DIGITAL CONVERTER

Don E. Meier, Marion, Iowa, assignor to Collins Radio Company, Cedar Rapids, Iowa, a corporation of Iowa Filed June 10, 1960, Ser. No. 35,286
1 Claim. (Cl. 340—347)

This invention relates in general to an analog-to-digital-to-analog integrator. It is often desirable to integrate input signals. For example, inertial and dead reckoning guidance systems are often used in aircraft and missiles which produce analog outputs. It is necessary to integrate such outputs at times.

The present invention relates to an integrator which has the following advantages: the overall accuracy of the integrator (including all linearity, drift, standoff, and environmental changes) is dependent upon the accuracy of only one component, a D.C. magnetic amplifier. Also, the integrator of this invention has infinite memory. That is, it does not forget the results of earlier inputs.

A feature of this invention is found in the provision for a magnetic amplifier which produces pulses to gate a switching circuit that controls a train of clock pulses which are fed to a counter.

An object of this invention is to provide an improved integrator. Yet another object is to provide an improved analog-to-digital-to-analog integrator.

Further objects, features and advantages will become apparent from the following description and claim when read in view of the drawings, in which:

Figure 5:
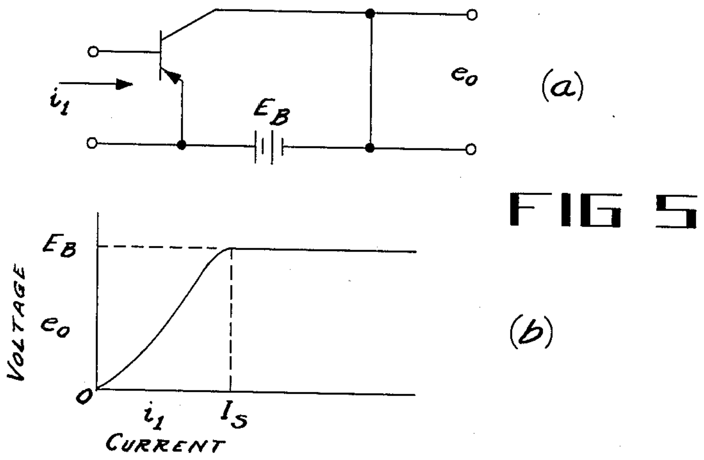
Figure 6:
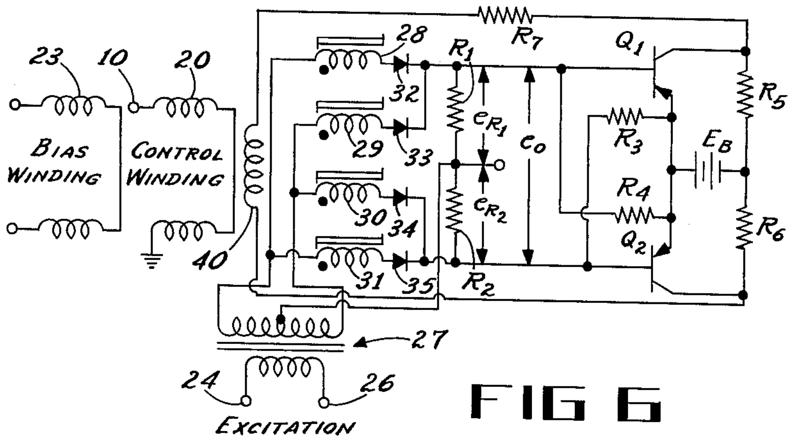
Figure 7:
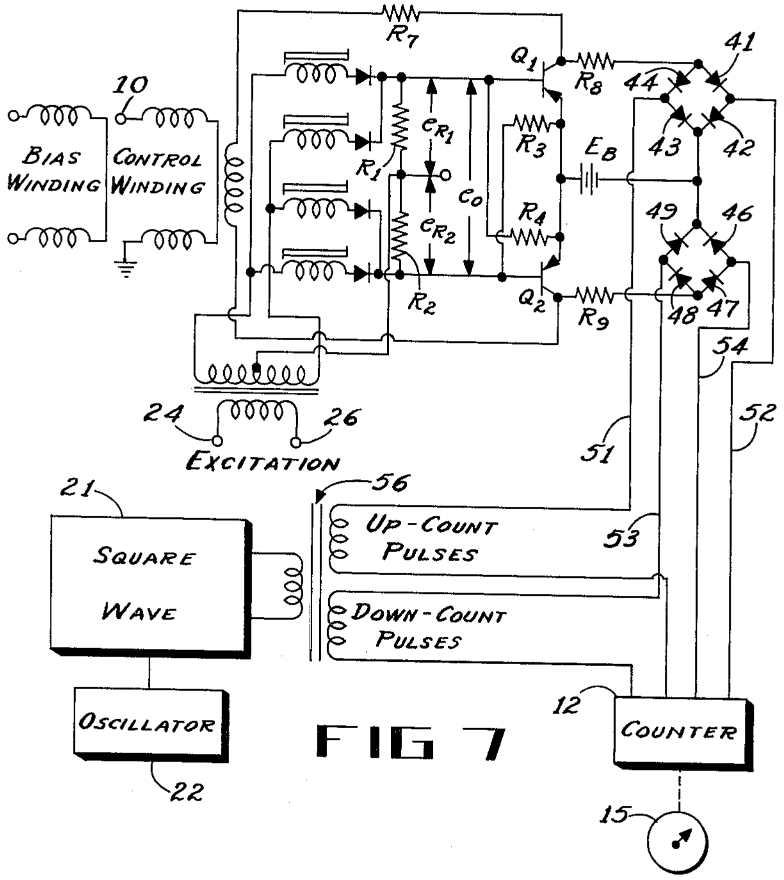

FIGURE 5 (*a*) and (*b*) illustrates a transistor switching circuit and its characteristic;

FIGURE 6 illustrates a switching circuit connected to the magnetic amplifier; and, FIGURE 7 illustrates the apparatus of the invention.

Figure 1:
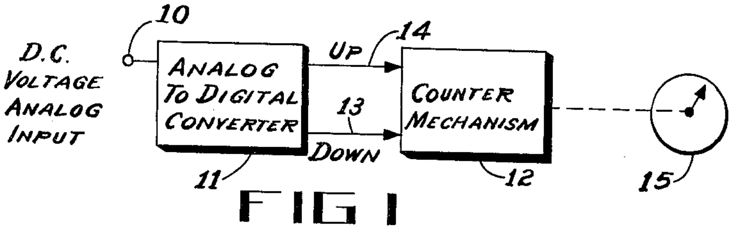
FIGURE 1 is a block diagram of the apparatus of this invention.
Figure 2:
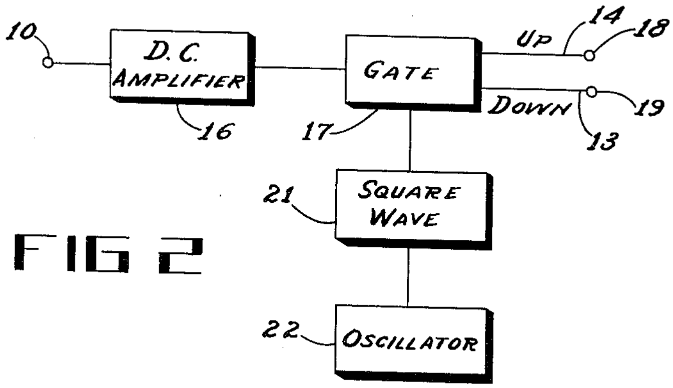
FIGURE 2 illustrates the analog to digital converter of this invention.

FIGURE 1 illustrates an analog-to-digital converter 11 which has input terminal 10. A counter 12 receives two inputs through leads 13 and 14 from converter 11. An indicator 15 is connected to counter 12. The components of the converter 11 are shown in FIGURE 2. A D.C. amplifier 16 which may be a magnetic amplifier receives an input from terminal 10 and supplies an output to a gate 17. An oscillator 22 supplies an input to square wave shaper 21 which passes an output to gate 17. The gate has two outputs, "up" and "down" which are supplied by leads 13 and 14 to the counter. Counter 12 may be of a conventional type and has an indicator which records the number of pulses.

Figure 3:
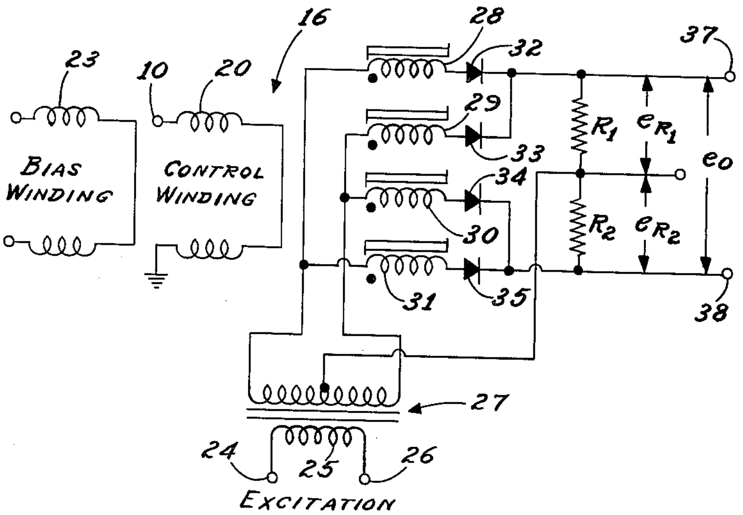
FIGURE 3 illustrates a magnetic amplifier used in this invention.

FIGURE 3 illustrates a conventional magnetic amplifier which has bias winding 23 and control winding 20. Terminal 10 of FIGURE 2 is connected to the control winding 20. Excitation voltage would be connected to winding 25. Power gate windings 28, 29, 30 and 31 are connected to diodes 32, 33, 34 and 35 in conventional fashion. Resistors $R_1$ and $R_2$ are connected across the outputs of windings 28, 29, 30 and 31 as shown.

Figure 4:
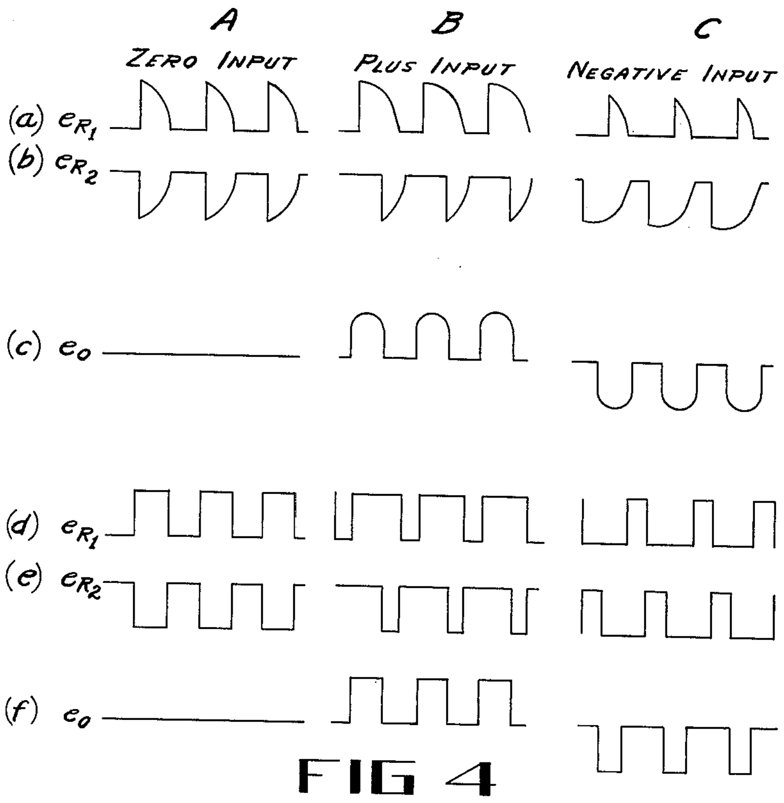
FIGURE 4 illustrates wave forms produced by the magnetic amplifier shown in FIGURE 3 with various inputs.

If the voltage applied to the excitation winding 25 is a sine wave, the voltages $e_0$ across terminals 37 and 38 and $e_{R_1}$ and $e_{R_2}$ across resistors $R_1$ and $R_2$ would be as shown in FIGURE 4 (*a*), (*b*), and (*c*) for different inputs to the control winding. FIGURE 4 (*a*), (*b*), and (*c*) (A) illustrates the situation where the control winding has zero signal applied to it. FIGURE 4 (*a*), (*b*) and (*c*) (B) illustrates the case where the control winding has a positive input and FIGURE 4 (*a*), (*b*) and (*c*) (C) illustrates the situation where the control winding has a negative input.

If the excitation signal is changed to a square wave the output voltage $e_o$ of the magnetic amplifier would be as shown in FIGURE 4 (*d*), (*e*) and (*f*) (A, B, and C). FIGURE 4 (*d*), (*e*), (*f*), (A) illustrates the output $e_o$ and the voltages $e_{R_1}$ and $e_{R_2}$ when there is no input at the control winding. FIGURE 4 (*d*), (*e*) and (*f*) (B) illustrates the respective voltages when there is a positive input, and FIGURE 4 (*d*), (*e*) and (*f*) (C) illustrates the output when there is a negative input.

It is to be observed that in the case of the sinusoidal excitation the output wave form is parially sinusoidal, and the relationship between the output voltage and the width of the pulse is not linear. When square wave excitation is used, the resulting output pulses are square, as shown in FIGURE 4 (*d*), (*e*) and (*f*). If the amplitude is maintained at a constant value, the output of the amplifier is directly proportional to pulse width (D.C. value) when square wave excitation is used. This satisfies the requirement for obtaining an accurate gating pulse. Thus, a square wave output pulse can be obtained directly from the magnetic amplifier shown in FIGURE 3 and it may be used as the D.C. amplifier 16 shown in FIGURE 2.

If the excitation voltage is a sine wave, the output of the magnetic amplifier may be converted to square waves by providing a pair of transistor switches according to FIGURE 5. As shown in FIGURE 5 (*b*) for values of $i_1$ between zero and $I_S$ there is a proportional change of $e_o$ with changes of $i_1$. For values of $i_1$ greater than $I_S$ the output poltage remains constant at $E_B$. When the input current is either zero or greater than $I_S$ a switching circuit is obtained and the corresponding output voltage is either $E_B$ or zero.

FIGURE 6 illustrates the magnetic amplifier of FIGURE 3 connected to a pair of transistors $Q_1$ and $Q_2$ which are connected to a battery $E_B$ which has resistors $R_3$, $R_4$, $R_5$ and $R_6$ connected in circuit therewith. The circuit of FIGURE 6 produces an output of constant amplitude pulses that vary in width. It is necessary to add another parameter to fulfill the linearity requirement. That requirement is that the width of the pulse be proportional to the magnetic amplifier input. This is done by adding inverse feedback. Feedback resistor $R_7$ connects a portion of the output of transistors $Q_1$ and $Q_2$ to the input of the magnetic amplifier through winding 40 so that the average value of output voltage $e_o$ is proportional to the input voltage $e_1$. Since the output amplitude is constant this assures that the width of the output pulses will be proportional to the input voltage. Thus, the circuitry required to obtain accurate variable width gating pulses has been obtained. These pulses are then used to operate gate 17 of FIGURE 2, which allows clock pulses from the pulse converter 21 to pass to the counter 12.

FIGURE 7 shows the magnetic amplifier having its output across resistors $R_1$ and $R_2$ supplied to the switch circuit comprising transistors $Q_1$ and $Q_2$. A first group of four diodes 41, 42, 43, and 44 are connected in series and connected across $Q_1$ and battery $E_B$. A second group of four diodes, 46, 47, 48, and 49, are connected in series and connected across $Q_2$ and battery $E_B$. The second group of diodes are connected so that negative pulses will pass and the first group are connected so that positive pulses will pass.

The diodes 41–44 and 46–49 are switched by the output pulses from $Q_1$ and $Q_2$.

For the output polarity shown in FIGURE 4 (*c*) (B) $Q_2$ supplies switching voltages to diodes 46–49. For the output polarity shown in FIGURE 4 (*c*) (C) $Q_1$ supplies switching voltages to diodes 41–44. The width of the switching voltage is proportional to the input applied to 10 of the magnetic amplifier.

Counter 12 receives "up" and "down" clock pulses from transformer 56 through diode switches 41–44 and 46–49 and leads 52 and 54. The path for "up" count clock pulses is by lead 51, through diode switch 41–44, and lead 52. The path for "down" count clock pulses is by lead 53, through diode switch 46–49, and lead 54. Counter 12 receives "up" count pulses for one polarity of input to 10 of the magnetic amplifier and "down" count pulses for the opposite polarity.

The number of clock pulses received by counter 12 in a given time period is proportional to the width of switching voltages applied to $Q_1$ and $Q_2$ and is therefore proportional to the amplitude of the analog input applied to 10 of the magnetic amplifier. The numerical sum of clock pulses is therefore the time integral of the analog input signal. Indicator 15 is connected to counter 12 and records the integral of the analog input signal supplied to terminal 10.

It is seen that this invention provides an improved analog to digital converter.

Although this invention has been described with respect to particular embodiments thereof, it is not to be so limited, as changes and modifications may be made therein which are within the spirit and scope of the invention as defined by the appended claim.

I claim:

An analog to digital integrator, comprising: a magnetic amplifier producing a pulsed output and having control windings and power windings, said control windings being adapted to receive analog information and said power windings being adapted to be connected to an A.-C. excitation source, said magnetic amplifier also including means for causing the width of the pulses produced at the output of said amplifier to be proportional to the analog input information; square wave generating means; gate means connected to said magnetic amplifier and said square wave generating means to receive the outputs therefrom whereby a pulsed output is produced from said gate means, the number of said pulses produced from said gate means being determined by the width of said pulses produced at the output of said magnetic amplifier; and means connected to the output of said gate means and responsive to said pulsed output therefrom producing digital readout.

References Cited by the Examiner

UNITED STATES PATENTS

| | | | |
|---|---|---|---|
| 2,932,449 | 4/60 | Pisarchik | 340—347 |
| 2,947,971 | 8/60 | Glauberman | 340—347 |
| 2,978,694 | 4/61 | Kalbfell | 340—347 |
| 2,994,825 | 8/61 | Anderson | 340—347 |
| 3,028,550 | 4/62 | Naydan et al. | 340—347 |
| 3,042,911 | 7/62 | Paradise et al. | 340—347 |
| 3,051,939 | 8/62 | Gilbert | 340—347 |
| 3,074,057 | 1/63 | Gilbert | 235—183 |

MALCOLM A. MORRISON, *Primary Examiner.*

IRVING L. SRAGOW, *Examiner.*